Figure 1:
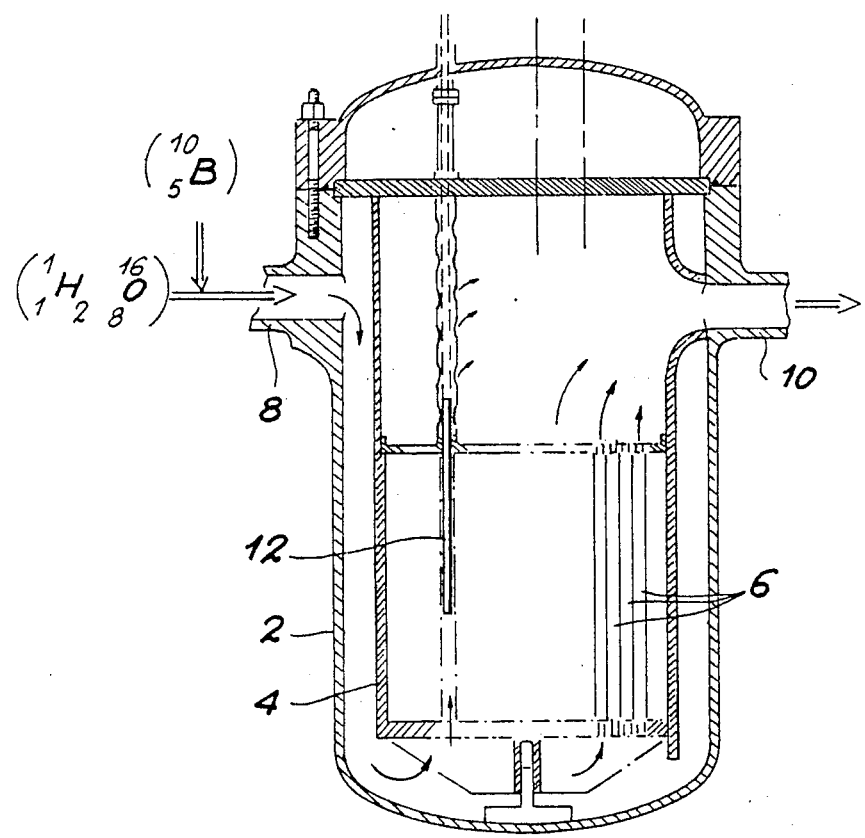

United States Patent [19]

Bernard et al.

[11] Patent Number: 4,876,057

[45] Date of Patent: Oct. 24, 1989

[54] CONTROL PROCESS FOR A NUCLEAR REACTOR

[75] Inventors: Patrice Bernard, Venelles; Laurent Sauvage; Henri Girard, both of Pertuis; Jean-Pierre Ferrero, Aix en Provence, all of France

[73] Assignee: Commissariat a L'Energie Atomique, Paris, France

[21] Appl. No.: 181,043

[22] Filed: Apr. 13, 1988

[30] Foreign Application Priority Data

Apr. 24, 1987 [FR] France ................................ 87 05824

[51] Int. Cl.[4] .............................................. G21C 7/36
[52] U.S. Cl. ..................................... 376/216; 376/217
[58] Field of Search ................................ 376/216, 217

[56] References Cited

U.S. PATENT DOCUMENTS

| | | | |
|---|---|---|---|
| 4,075,059 | 2/1978 | Bruno | 376/216 |
| 4,330,367 | 5/1982 | Musick | 376/245 |
| 4,333,797 | 6/1982 | Nishizawa | 376/210 |
| 4,637,910 | 1/1987 | Impink | 376/216 |
| 4,642,213 | 2/1987 | Impink | 376/218 |
| 4,654,186 | 3/1987 | Leroy | 376/216 |
| 4,711,753 | 12/1987 | Impink | 376/216 |
| 4,774,050 | 9/1988 | Impink | 376/245 |

FOREIGN PATENT DOCUMENTS

| | | |
|---|---|---|
| 0102068 | 8/1983 | European Pat. Off. . |
| 2025975 | 12/1971 | Fed. Rep. of Germany . |
| 1395221 | 5/1964 | France . |
| 2171242 | 2/1986 | United Kingdom . |

Primary Examiner—Donald P. Walsh
Attorney, Agent, or Firm—Kerkam, Stowell, Kondracki & Clarke

[57] ABSTRACT

It consists of determining by an iterative calculation the neutron flux $\phi(j,g)$ at each point j of the core in the form of a sum of two components, the first component being associated with a predetermined state of the core defined by predetermined interaction probabilities of the neutrons in the core and the second component being linked with the real state of the core, with said predetermined state and with said first component. The power given off $P(j)$ and the number of emitted neutrons $S(j)$ at each point of the core are then deduced from the neutron flux. The power given off $P(j)$ and the neutron flux $\phi(j,g)$ are used for controlling the core regulating means, such as the control rods or the boron concentration.

15 Claims, 3 Drawing Sheets

CONTROL PROCESS FOR A NUCLEAR REACTOR

DESCRIPTION

The present invention relates to a control process for a nuclear reactor comprising controlling the neutron flux and the power distribution in the reactor core.

This control comprises a stage of determining the neutron flux and the power distribution and a regulation stage through the displacement of control rods in the reactor core and/or modification of the boron concentration in the reactor primary circuit, as a function of the determined neutron flux and power distribution.

The control can in particular be carried out as a function of the result of the comparison between the neutron flux and the power distribution as determined and desired values for said neutron flux and said power distribution, said desired values representing limit values or the safety criteria of the reactor.

The process according to the invention makes it possible to very rapidly obtain neutron flux and power distribution values. This permits on-line applications, such as:

detection of abnormalities in connection with the position of the control bars and the boron concentration, simulation of the behaviour of the core in the transient mode and investigating an optimum core control strategy, assisting the monitoring of the physical state of the core and interpretation of measurements on the core, e.g. for reactivity measurements.

This property can also be used in out-of-line applications, such as:

core design calculations, analysis of normal or abnormal transients, detailed calculations of the evolution of isotopic compositions of the fuel as a function of the irradiation level, calculations of the recharging of fuel assemblies into the cores of operating reactors, new core control studies, studies of new core control strategies.

In general terms, the nuclear reactor core comprises assemblies constituted by fissile materials, with which the neutrons react in accordance with the following main processes:

impact on nuclei of fissile materials with modification of the direction and velocity of the neutrons undergoing the shock, trapping by a nucleus, without emission of new neutrons, absorption by a nucleus, with emission of new neutrons.

Fission is the preponderant phenomenon in nuclear reactors and is associated with the giving off of a large amount of energy. In the time interval separating two interaction events, the displacement of the neutrons is rectilinear and uniform.

One state of the core can be characterized by the properties of the fissile materials contained in it, the distribution of the neutrons in the core and their interaction with the nuclei of fissile materials.

Thus, one state of the core is defined by a number of parameters and more specifically by the value of each of these parameters at each point of the core. In practice, the state of the core is defined by the value of each parameter in a plurality of zones, meshes or networks, all of which represent the core volume.

The meshes are preferably identical and can e.g. consist of cubic volumes. In this case, for a 900 MWe pressurized water nuclear reactor, the core e.g. corresponds to a total of approximately 22,000 cubic meshes, each having a side length of approximately 10 cm. Throughout the remainder of the text the total number of meshes is designated J and the mesh index j ($1 \leq j \leq J$).

For the practical determination of the power and flux distribution in the nuclear reactor core, the range of neutron velocities is conventionally broken down into finite intervals, designated by the index g, in which g varies from 1 to G, G being the total number of velocity groups.

The magnitudes describing the distribution of the neutrons in the core are then:

the neutron density $n(j,g)$, which represents the number of neutrons per volume unit which, in the mesh j, are in the velocity group g.

the neutron flux $\phi(j,g)$ in the mesh j which is, by definition, the product of the neutron density $n(j,g)$ by the mean velocity of the neutrons of the velocity group g.

The magnitudes describing the core characteristics with respect to the interaction with the neutrons (hereinafter called interaction probabilities) are:

the effective differential macroscopic diffusion section $\Sigma s(j,g \rightarrow g')$ equal to $Rs(j,g \rightarrow g')/\phi(j,g)$, in which $Rs(j,g \rightarrow g')$ is the number of neutrons of the velocity group g undergoing, per time and volume unit, a shock in the mesh j and being diffused, after the shock, with a new velocity in the velocity group g', the total effective macroscopic diffusion section $\Sigma s(j,g)$ defined by $$\sum_{g'=1}^{G} \Sigma s(j,g \rightarrow g')$$

and equal to $Rs(j,g)/\phi(j,g)$, in which $Rs(j,g)$ is the number of neutrons of the velocity group g undergoing a shock per volume and time unit, the effective macroscopic trapping section $\Sigma s(j,g)$ equal to $Rc(j,g)/\phi(j,g)$, in which $Rc(j,g)$ represents the number of neutrons of the velocity group g absorbed per time and volume unit without reemission of new neutrons, the effective macroscopic fission section $\Sigma s(j,g)$ equal to $Rf(j,g)/\phi(j,g)$, in which $Rf(j,g)$ represents the number of fissions, per time and volume unit, induced by the neutrons of the velocity group: during a fission, there is an emission of on average new neutrons and a giving off of approximately 200 MeV of energy by fission: subsequently it will be considered for simplification purposes that the ratio $K/\nu$ is constant, the effective macroscopic absorption section $\Sigma a(j,g)$ in group g equal to $\Sigma c(j,g) + \Sigma(j,g)$, the total effective macroscopic section $\Sigma t(j,g)$ in group g equal to $\Sigma a(j,g) + \Sigma s(j,g)$.

The total number $S(j)$ of neutrons emitted by the mesh j, also called neutron source, per time and volume unit is defined by:

$$S(j) = \sum_{g=1}^{G} \nu \cdot \Sigma f(j,g) \cdot \phi(j,g)$$

In the same way, the power P(j) emitted by the mesh j is defined by $P(j)=(K/\nu) \cdot S(j)$ (if it is considered that the ratio $K/\nu$ is constant).

It is known that the knowledge of the parameters $\Sigma s(j,g \rightarrow g')$, $\Sigma a(j,g)$, $\Sigma t(j,g)$ and $\nu \cdot \Sigma f(j,g)$ in each mesh j, $1 \leq j \leq J$ makes it possible to determine the value of the quantity $\phi(j,g)$, $S(j)$ and $P(j)$.

A first known process consists of calculating the neutron flux $\phi(j,g)$ in each mesh j by a method with finite differences. This process is described in the works "Nuclear Reactor Theory" by George Bell and Samuel Glasstone, Van Nostrand Reinhold Company and "Introduction à l'analyse numérique matricielle et à l'optimisation" by P. G. Ciarlet, published by Masson.

A second known process consists of calculating the neutron flux $\phi(j,g)$ in each mesh j by a nodal method.

These two processes are based on iterative methods, whereof the main calculation stage consists of reversing a matrix of size $J \times J$, in which J represents the number of meshes and is equal to a few tens of thousands. It is clear that this calculation requires powerful processing means making it costly. In order to reduce the costs, it is possible to use less powerful processing means, but it is then necessary to accept a longer calculation time for determining the neutron flux and power in the reactor core, which is not satisfactory in the case of on-line monitoring of said core.

The object of the invention is to permit a real time control of the reactor core. This is achieved by a rapid determination method for the neutron flux and the power without any need for reversing a large size matrix.

In general terms, the invention consists of determining the neutron flux in the form of a sum between a first neutron flux component, associated with a predetermined core state, and a second neutron flux component, associated with the real state of the core.

More specifically, the invention relates to a process for the control of a nuclear reactor having a core containing fissile material assemblies, the fission of the nuclei of said materials being brought about by interactions with neutrons and producing in turn neutrons, said nuclear reactor also having a means for regulating the neutron flux in the reactor core and the power given off by said reactor core, said regulating means comprising at least one assembly of control rods displaceable in said reactor core, said process being characterized in that:

(A) iteratively there is a determination of the neutron fluxes $\phi(j,g)$ for each zone or mesh j $1 \leq j \leq J$ of a group of meshes corresponding to the volume of the reactor core and for each velocity group g $1 \leq g \leq G$ of a plurality of velocity groups for the neutrons; and the numbers of neutrons or sources S(j) emitted by each mesh j, $1 \leq j \leq J$, per volume and time unit, the determination of said values consisting of repeating the following sequence of operations until said values converge:

(a) calculation of the first components of the neutron flux $\phi^0(j,g)$, $1 \leq j \leq J$ as a function of the predetermined coupling matrixes $[\psi g]$ $1 \leq g \leq G$ and sources S(j), each element $\psi g(j,k)$, $1 \leq k \leq K$ and $1 \leq j \leq J$ expressing for neutrons of the velocity group g $1 \leq g \leq G$, the coupling between the mesh j and the adjacent meshes k corresponding to predetermined interaction probabilities of the neutrons with the fissile materials of the core for each mesh j, $1 \leq j \leq J$, (b) calculation of the real interaction probabilities of the neutrons in the core as a function of physical parameters describing the state of the core, (c) calculation of second neutron flux components $\phi^1(j,g)$, $1 \leq j \leq J$ as a function of the neutron fluxes $\phi^0(j,g)$ of the predetermined interaction probabilities of the neutrons in the core and the real interaction probabilities of the neutrons in the core, (d) calculation of the neutron fluxes $\phi(j,g)$ in each mesh j, as the sum of the first and second neutron flux components, (e) calculation of the new sources NS(j), $1 \leq j \leq J$ associated with each neutron flux $\phi(j,g)$ and new values of sources S(j) by the relation:

$$S(j) = \frac{NS(j)}{\sum_{j=1}^{J} NS(j)}$$

(f) calculation of the powers P(j) emitted in each mesh j as a function of the total power P emitted and the sources S(j), (B) the regulating means is controlled as a function of the neutron fluxes $\phi(j,g)$ and powers P(j).

In preferred manner, the interaction probability of the neutrons in the core is defined by all the following parameters for each mesh j, $1 \leq j \leq J$:

effective macroscopic diffusion sections $\Sigma s(j,g \rightarrow g')$ of the neutrons of the velocity group g, $1 \leq g \leq G$ in the velocity group g', $g' \neq g$, effective macroscopic absorption section $\Sigma s(j,g)$ of the neutrons of velocity g, $1 \leq g \leq G$, effective macroscopic fission section $\Sigma f(j,g)$ of the neutrons of velocity g, $1 \leq g \leq G$.

In the same way, the predetermined interaction probabilities of the neutrons in the core can be defined for each mesh j, $1 \leq j \leq J$ and each velocity group, g, $1 \leq g \leq G$ by:

effective macroscopic diffusion sections $\Sigma s^0(j,g\ g')$, whose values are the possible values for said core, an effective macroscopic absorption section $\Sigma a^0(j,g)$, whose value is a possible value for said core, an effective macroscopic fission section $\Sigma f^0(j,g)$ of value equal to zero.

In preferred manner, for each mesh j, $1 \leq j \leq J$, all the second neutron flux components, $\phi^1(j,g)$, $1 \leq g \leq G$ is determined as the solution of the system with G linear equations:

$$-\Sigma t(j,g) \cdot \phi^1(j,g) + \sum_{g=1}^{G} \Sigma s(j,g\ g') \cdot \phi^1(j,g) =$$

$$\overset{1}{\underset{t}{\Sigma}} (j,g) \cdot \phi^0(j,g) - \overset{G}{\underset{g'=1}{\Sigma}} \overset{1}{\underset{s}{\Sigma}} (j,g' \rightarrow g) \cdot \phi^0(j,g')$$

in which $\Sigma t(j,g) = \Sigma a(j,g) = \overset{G}{\underset{g'=1}{\Sigma}} \Sigma s(j,g \rightarrow g')$ $$\overset{1}{\underset{t}{\Sigma}} (j,g) = \Sigma t(j,g) - \left[ \overset{0}{\underset{a}{\Sigma}} (j,g) + \overset{G}{\underset{g'=1}{\Sigma}} \overset{0}{\underset{s}{\Sigma}} (j,g \rightarrow g') \right]$$

and $\overset{1}{\underset{s}{\Sigma}} (j,g \rightarrow g') = \Sigma s(j,g \rightarrow g') - \overset{0}{\underset{s}{\Sigma}} (j,g \rightarrow g')$.

The characteristics and advantages of the invention can be better gathered from the following description given in illustrative and non-limitative manner, with reference to the attached drawings, wherein show:

FIG. 1 a sectional view of a nuclear reactor vessel.

Figure 2A:
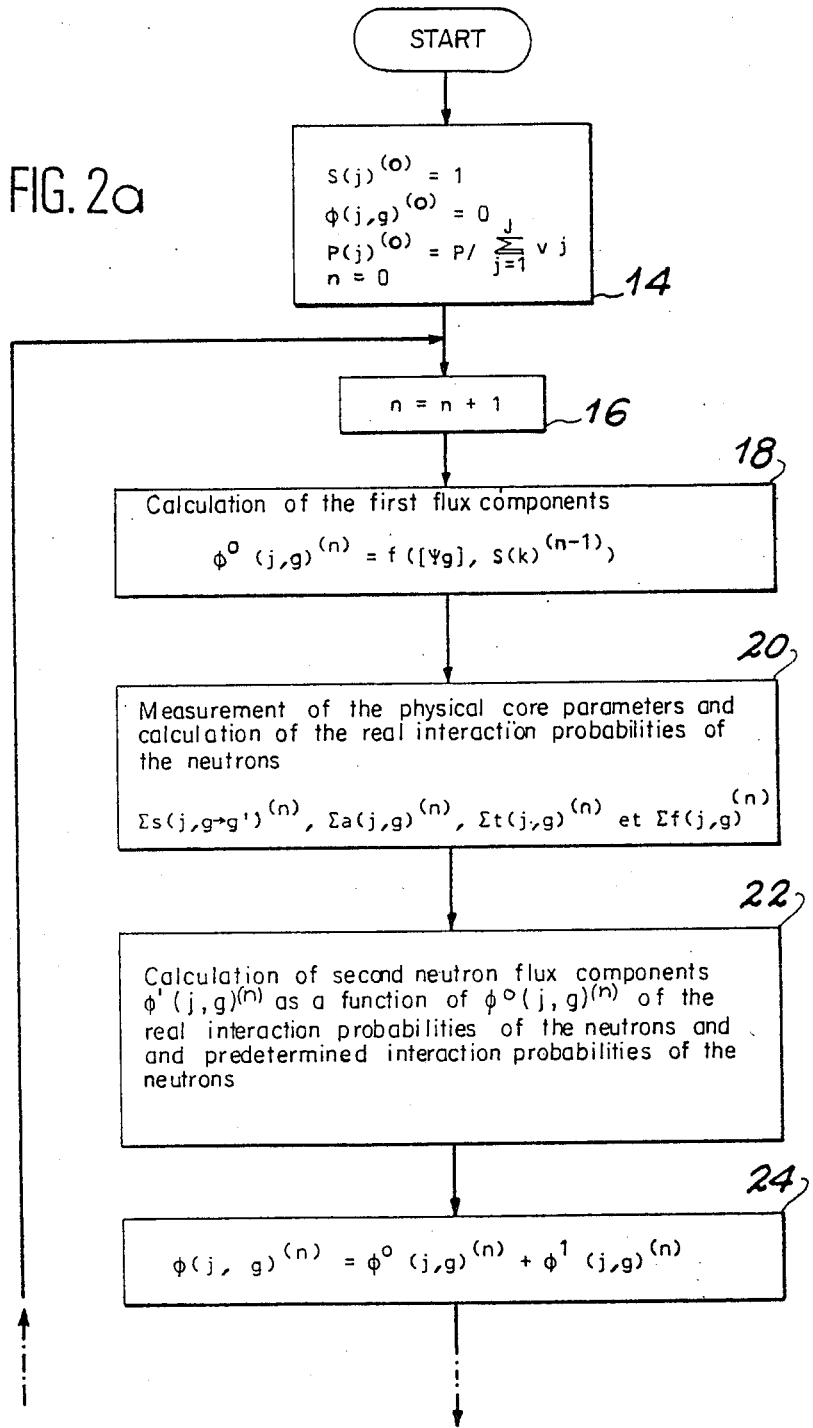
Figure 2B:
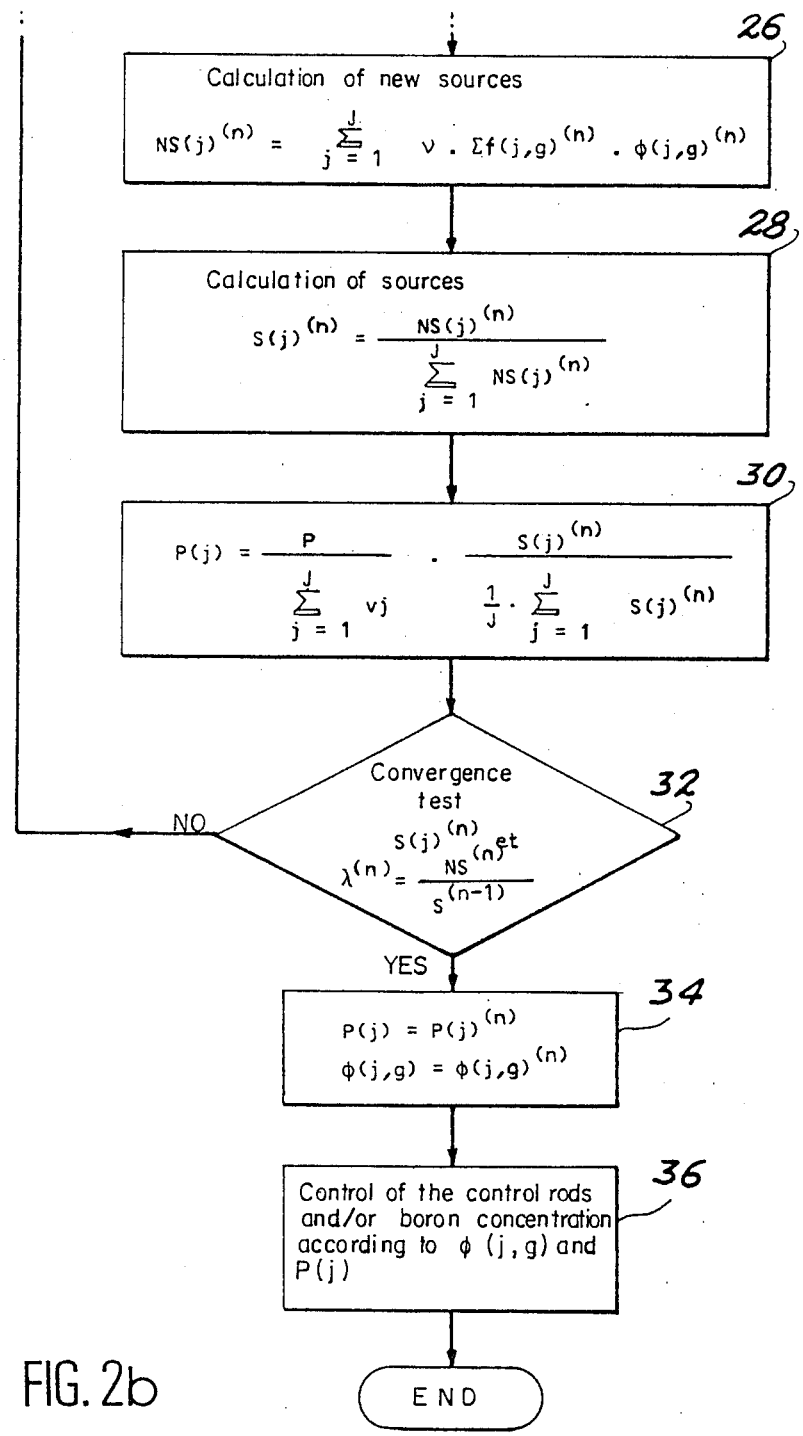

FIGS. 2a and 2b a flowchart illustrating the inventive process.

FIG. 1 shows a sectional view of a pressurized nuclear reactor vessel 2. The core of said nuclear reactor comprises:

(a) Nuclear fuel (fissile materials) contained in jacketing and referred to as fuel rods 6, which are positioned vertically.

(b) Sometimes, neutron-absorbing rods, often called consumable poison rods. The absorbing or fuel rods are maintained in mechanical structures, called assemblies. The core is constituted by assemblies and the network formed by the rods is generally regular.

(c) A cooling fluid supplied by a feed pipe 8 and discharged by a discharge pipe 10 connected to a pump. This fluid flows vertically from top to bottom in the core and is constituted by water in the form $_1^1H_2\ _8^{16}O$ having the property of slowing down the neutrons. In the case of a pressurized water system, the water can contain, in solution, neutron-absorbing nuclei and in particular boron nuclei $_5^{10}B$.

(d) Control rods 12 containing materials absorbing the neutrons which can be vertically displaced in the core during reactor operation. These control rods are used for the rapid control of the power in the core.

A description will now be given of the inventive process with reference to the flowchart of FIGS. 2a and 2b. In order not to overburden the description, the simplified case will be assumed in which the neutron sources consist solely of fast fission neutrons. At the end of the description reference will be made to the general or kinetic case, in which the neutron sources also have delayed neutrons.

This process involves a stage of determining the neutron flux $\phi(j,g)$, the power $P(j)$ and the source $S(j)$ in each mesh j by an iterative calculation, as well as a stage of using given physical quantities for controlling the core regulating means.

The inventive process starts with an operation of initializing the values of the sources $S(j)$, the neutron fluxes $\phi(j,g)$ and powers $P(j)$.

The initial value of the sources $S(j)$ can be fixed in arbitrary manner, e.g. at 1. More advantageously they can be considered as equal, for the calculation of the neutron fluxes and powers at an instant t, to the value calculated according to the inventive process at a prior instant t' (t'<t). In the first case, it is experimentally found that the first stage of the inventive process requires a number of iterations n of approximately 100, whereas in the second case n is approximately a few units.

In the same way, the neutron fluxes $\phi(j,g)$ can be initially fixed at the value zero, but can be advantageously fixed at values determined at a preceding instant by the process of the invention.

Finally, the powers $P(j)$ are preferably preset to a value:

$$\frac{P}{\sum_{j=1}^{J} v_j}$$

in which P is the total power of the core, which is known by measurements carried out thereon and $v_j$ is the volume of mesh j.

Operation 16 in FIG. 2a notes the incrementation of the iteration index n. Each iteration consists of a sequence of operations 18–30 and ends by a convergence test 32.

Operation 18 relates to the calculation of a first neutron flux component $\phi^0(j,g)$ of the real neutron flux $\phi(j,g)$. Each first component $\phi^0(j,g)^{(n)}$ at the nth iteration is expressed as a function of a predetermined coupling matrix $[\psi g]$ and sources $S(j)^{(n-1)}$ calculated during the preceding iteration n−1. There are in all G coupling matrixes, one per velocity group g and each having a size K×K, in which K is the number of adjacent matrixes to a random matrix.

The coupling matrixes $[\psi g]$ are associated with the influence field of neutron exchanges between meshes k, $1 \leq k \leq K$, adjacent to a mesh j (and including the latter) and mesh j. These predetermined coupling matrixes are calculated for a predetermined state of the core (also called reference medium), i.e. for predetermined interaction probabilities of the neutrons in the core.

The terms $\psi g(j,k)$, $1 \leq j \leq J$ and $1 \leq k \leq K$ of the coupling matrixes $[\psi g]$ are defined by the following relation:

$$\psi g(j,k) = \frac{1}{v_j \cdot v_k} \underset{\text{mesh } j}{\int\int\int} \underset{\text{mesh } k}{\int\int\int} \psi g(d(x_j,x_k)) \cdot d^3x_j \cdot d^3x_k$$

in which $v_j = \underset{\text{mesh } j}{\int\int\int} d^3x_j$ and $v_k = \underset{\text{mesh } k}{\int\int\int} d^3x_k$ are the volumes of the meshes j and k and $r=d(x_j,x_k)$ is the distance between a point $x_j$ of mesh j and a point $x_k$ of mesh k.

The term $\psi g(r)$ represents the neutron flux in cm$^{-2}$ at a point $x_j$ of mesh j at distance $r=d(x_j,x_k)$ created by a source located at point $x_k$ of mesh k and emitting one neutron/second in accordance with a fission spectrum $\chi_g$.

The term $\psi g(j,k)$ represents the mean flux in mesh j produced by a source uniformly distributed in mesh k and emitting one neutron/second in accordance with the fission spectrum $\chi_g$ in the velocity group g.

For a fission spectrum $\chi_g$, the term $\psi g(r)$ can e.g. be determined in known manner on the basis of the ANISN transport code. The terms $\psi g(j,k)$ are then obtained by integration, which can introduce a certain imprecision in the values of terms $\psi g(j,k)$. It is possible to ensure that the values found are correct by proving that the equation:

$$\sum_{k=1}^{K} \sum_{g=1}^{G} \psi g(j,k) \cdot \overset{0}{\Sigma}_a, g \cdot v_k = 1$$

is satisfied, which means that in the area formed by the K meshes, there is an absorption of one neutron (in the equation $\Sigma a^0,g$ is the effective macroscopic absorption section of the reference medium for group g).

The first components of the neutron fluxes $\phi^0(j,g)^{(n)}$ can be calculated on the basis of the coupling matrixes $]\psi g]$, notably according to the equation:

$$\phi(j,g)^{(n)} = \sum_{k=1}^{K} \psi g(j,k) \cdot S(j)^{(n-1)} \cdot v_k$$

in which $v_k$ is the volume of mesh k.

The predetermined interaction probabilities, i.e. associated with the reference medium are e.g. defined by predetermined values of the effective macroscopic sections $\Sigma a^0(j,g)$, $\Sigma s^0(j,g \rightarrow g')$, $\Sigma t^0(j,g)$ and $\Sigma f^0(j,g)$. Preferably $\Sigma f^0(j,g)$ is chosen equal to zero.

Each coefficient $\psi g(j,k)$ represents the flux in group g and mesh j, when one neutron is emitted per volume unit and time unit, in a homogeneous manner in mesh k in accordance with the fission spectrum, in a core for which the interaction probabilities of the neutrons are said predetermined interaction probabilities.

The values are defined for each assembly type and are preferably chosen in such a way that the predetermined effective macroscopic sections are close to the real effective macroscopic sections in the core under normal operating conditions. This makes it possible to have a higher precision in the calculation of the neutron fluxes $\phi(j,g)$ and powers P(j). It is e.g. possible to choose a value for each predetermined effective macroscopic section equal to the mean value of the possible amplitude range for said effective macroscopic section.

The following operation 20 of the process consists of evaluating second neutron flux components $\phi^1(j,g)^{(n)}$ as a function of the real interaction probabilities of the neutrons in the core. In known manner, they are deduced from values of physical parameters describing the state of the core, the values of said physical parameters being in known manner either directly detectable by sensors, or evaluatable on the basis of indirect measurements.

The generally known physical parameters are:

(a) the position PBCq of each control rod q, $1 \leq q \leq Q$, in which Q is the total number of control rods, (b) the intake temperature $\theta_E$ of the cooling fluid into the core, (c) the pressure PR of the cooling fluid in the core, (d) the boron concentration $C_B$ in the core, (e) the total power P supplied by the core, (f) the description of the position of the assemblies of each type in the core and (g) the neutron fluxes $\phi(j,g)^{(n-1)}$ and the powers $P(j)^{(n-1)}$ calculated at the preceding iteration instant $n-1$.

On the basis of these physical parameters, it is possible to evaluate for each mesh j, a group of local parameters, such as:

(a) the temperature of the fuel Tu(j), (b) the temperature of the cooling fluid $\theta(j)$, (c) the density of the cooling fluid (j), (d) the concentration Xe(j) in nuclei of $_{54}{}^{135}Xe$, (e) the irradiation rate or the wear of the fuel I(j), (f) the state $x_m(j)$ (presence or absence) of a control rod of type m in mesh j, (g) a parameter p(j) characterizing the assemblies from the standpoint of their equivalent neutron properties (presence or absence of consumable poisons, initial $_{92}{}^{235}U$ enrichment, initial plutonium content, initial plutonium isotope composition, etc.).

More specifically, the parameters Tu(j), $\theta(j)$ and (j) are calculated by relations expressing the thermal aspects of the fuel nucleus and the thermohydraulic aspects of the water in the rods on the basis of the physical parameters $\theta_E$, PR, PBCq, P and powers P(j). The parameter Xe(j) is calculated on the basis of the neutron fluxes $\phi(j,g)$ by relations expressing the formation and disappearance of $_{54}{}^{135}Xe$ nuclei. The parameter I(j) is calculated by a time-based wear relationship.

Reference can be made to the work "Nuclear Reactor Theory" by George I. Bell and Samuel Glasstone, Van Nostrand Reinhold Company for a description of methods for obtaining local parameters on the basis of physical parameters.

The interaction probabilities of neutrons in the core, which can e.g. be defined by the effective macroscopic sections $\Sigma s(j,g \rightarrow g')$, $\Sigma a(j,g)$, $\Sigma t(j,g)$ and $\Sigma f(j,g)$, are then deduced in known manner from local parameters and the boron concentration $C_B$. A method of calculating the effective macroscopic sections as a function of local parameters and $C_B$ is e.g. given in the document "Homogenization methods in reactor physics" issued by the International Atomic Energy Agency, Vienna, 1980.

Following operation 20 relating to the evaluation of the effective real macroscopic sections, i.e. those corresponding to the effective values of the physical parameters of the core, in operation 22 second neutron flux components $\phi^1(j,g)^{(n)}$ are calculated. The latter are expressed as a function of the first neutron flux component $\phi^0(j,g)^{(n)}$, predetermined interaction probabilities of the neutrons in the core and real interaction probabilities of the neutrons in the core. For each mesh j, $1 \leq j \leq J$, this relation can be expressed by a linear system with G equations:

$$-\Sigma t(j,g)^{(n)} \cdot \phi^1(j,g)^{(n)} + \sum_{g=1}^{G} \Sigma s(j,g \rightarrow g')^{(n)} \cdot \phi^1(j,g)^{(n)} =$$

$$\overset{1}{\underset{t}{\Sigma}}(j,g)^{(n)} \cdot \phi^0(j,g)^{(n)} - \sum_{g=1}^{G} \overset{1}{\underset{s}{\Sigma}}(j,g' \rightarrow g)^{(n)} \cdot \phi^0(j,g')^{(n)},$$

$$\text{in which } \overset{1}{\underset{t}{\Sigma}}(j,g)^{(n)} = \Sigma t(j,g)^{(n)} - \overset{0}{\underset{t}{\Sigma}}(j,g)$$

$$\text{and } \overset{1}{\underset{s}{\Sigma}}(j,g' \rightarrow g)^{(n)} = \Sigma s(j,g' \rightarrow g)^{(n)} - \overset{0}{\underset{s}{\Sigma}}(j,g' \rightarrow g)$$

For each mesh, it is consequently a question of resolving a system of G equations with G unknowns $\phi^1(j,g)^{(n)}$, $1 \leq g \leq G$. The number G of velocity groups is in general a few units. Thus, the linear system can be simply resolved by reversing the associated matrix of size $G \times G$.

Operations 18 and 22 respectively supply the first neutron flux components $\phi^0(j,g)^{(n)}$ and the second neutron flux components $\phi^1(j,g)^{(n)}$. The neutron fluxes $\phi(j,g)^{(n)}$ are then calculated as the sum of the first and second components by operation 24.

In the particular case, which frequently occurs in practice, where the number of velocity groups is equal to 2 (G=2) and in which there is no rise of neutrons of group 2 (slow velocities) into group 1 (fast velocities) during a diffusion, the neutron fluxes $\phi(j,g)^{(n)}$ for velocities g=1 and g=2 can be more rapidly calculated in direct manner on the basis of first neutron flux components $\phi^0(j,g)^{(n)}$ by the following expressions:

$$\phi^1(j,1)^{(n)} = a \cdot \phi^0(j,1)^{(n)}$$

$$\text{and } \phi^1(j,2)^{(n)} = b \cdot \phi^0(j,1)^{(n)} + c \cdot \phi^0(j,2)^{(n)}$$

-continued $$\text{in which } a \doteq 1 - \frac{\frac{1}{a}\Sigma(j,1)^{(n)} + \frac{1}{s}\Sigma(j,1\to2)^{(n)}}{\Sigma a(j,1)^{(n)} + \Sigma s(j,1\to2)^{(n)}}$$

$$b = \frac{1}{\Sigma a(j,2)^{(n)}} \cdot$$

$$\left[\frac{1}{s}\Sigma(j,1\to2)^{(n)} - \Sigma s(j,1\to2)^{(n)} \cdot (1-a)\right]$$

$$\text{and } c = 1 - \frac{\frac{1}{a}\Sigma(1j,2)^{(n)}}{\Sigma a(j,2)^{(n)}}$$

$$\text{with } \frac{1}{a}\Sigma(j,g) = \Sigma a(j,g)^{(n)} - \frac{0}{a}\Sigma(j,g) \text{ for } g = 1,2$$

$$\text{and } \frac{1}{s}\Sigma(j,1\to2) = = \Sigma s(j,1\to2)^{(n)} - \frac{0}{s}\Sigma(j,1\to2)$$

In the particular case where G=2, it is consequently not necessary to explicitly calculate the second neutron flux components $\phi^1(j,g)^{(n)}$, so that operation 22 is eliminated.

The knowledge of the neutron fluxes $\phi(j,g)^{(n)}$ makes it possible to evaluate th new values $S(j)^{(n)}$ of the sources. Initially, operation 26 is used for determining new sources $NS(j)^{(n)}$ as a function of the neutron fluxes $\phi(j,g)^{(n)}$ and effective fission section $\Sigma f(j,g)$, according to relation:

$$NS(j)^{(n)} = \sum_{J=1}^{J} \nu \cdot \Sigma f(j,g)^{(n)} \cdot \phi(j,g)^{(n)}$$

in which $\nu$ is the mean number of new neutrons produced by one fission.

Secondly (operation 28), an updated value is calculated of sources $S(j)$ by:

$$S(j)^{(n)} = \frac{NS(j)^{(n)}}{\sum_{j=1}^{J} NS(j)^{(n)}}$$

From this is deduced by operation 30 the value of the power given off by each mesh j in accordance with relation:

$$P(j) = \frac{P}{\sum_{j=1}^{J}\nu j} \cdot \frac{S(j)^{(n)}}{\frac{1}{J}\sum_{j=1}^{J}S(j)^{(n)}}$$

Thus, at the end of operation 30, the neutron flux $\phi(j,g)^{(n)}$, the source $S(j)^{(n)}$ and the power given off $P(j)^{(n)}$ are obtained for each mesh j $1 \leq j \leq J$.

A test 32 is then performed to determine whether there is convergence of the calculated values, or whether it is necessary to perform a new iteration. The test can e.g. apply to sources $S(j)$ and to the multiplication rates of the neutrons in the core, said rate being defined by $\lambda^{(n)} = NS^{(n)}/S^{(n-1)}$.

For the sources $S(j)$, there is a comparison for each mesh j, of the relative increase $|S(j)^{(n)} - S(j)^{(n-1)}/S(j)^{(n-1)}|$ with a constant factor $\epsilon$ having a value equal to e.g. $10^{-4}$. In the same way, there is a comparison of the increase of the multiplication rate $|(\lambda^{(n)} - \lambda^{(n-1)})/\lambda^{(n-1)}|$ with a constant factor $\eta$ having a value e.g. equal to $10^{-5}$.

If the two comparisons indicate that there is convergence, the process is continued by operation 34. In the opposite case, operation 16 is repeated to start a new iteration. If convergence occurs, the values $P(j)^{(n)}$ and $\phi(j,g)^{(n)}$ are respectively allocated to parameters $P(j)$ and $\phi(j,g)$ (operation 34).

These values are then used for controlling the core by acting on the position of the control rods and/or on the boron concentration. More specifically, the values $P(j)$ and $\phi(j,g)$ make it possible to accurately evaluate the physical limits of the core and to compare them in conventional manner with thresholds respecting the safety criteria of the reactor. This comparison leads to an action on the control rods and/or the boron concentration and/or the transmission of an alarm signal.

In the preceding description, the neutron sources only had neutrons directly resulting from fission. In practice, account can also be taken of sources formed from delayed neutrons. This only slightly modifies the equations defining the fluxes $\phi^0(h,g)$, $\phi^1(j,g)$ and the new sources $NS(j)$.

Thus, the kinetic case consists of taking into account the sources $S_k^{PREC}$ linked with delayed neutron precursors and the flux variation term $$\frac{1}{v} \cdot \frac{d\phi}{dt},$$

in which v is the mean neutron velocity. In order to take account of delayed neutrons, it is necessary to introduce a time index m, the calculations being performed iteratively (n being the iteration index) at each time t equal to $t_0 + m.\Delta t$.

The first flux component $\phi^0(j,g)^{(n,m)}$ is defined by $$\phi^0(j,g)^{(n,m)} =$$

$$\sum_k \left[ \psi g(j,k) \cdot S_k^{(n-1,m)} + \psi g^{PREC}(j,k) \cdot S_k^{PREC(n-1,m)} \right] \cdot \nu_k$$

in which $\psi g(j,k)^{PREC}$ represents the mean flux in mesh j for the velocity group g, associated with a source uniformly distributed in mesh k and emitting one neutron per second in accordance with the emission spectrum of the delayed neutron $\chi_g^{PREC}$.

Thus, the first flux component appears as the sum of two fluxes, each produced by a particular neutron source. These sources are calculated by the following equations:

$$S_k^{(n,m)} = (1-\beta) \sum_g \cdot \Sigma f(j,g) \cdot \phi_{(j,g)}^{(n-1,m)}$$

in which $\beta$ is the total number of delayed neutrons per fission neutron and $$S_k^{PREC(n,m)} = \sum_{i=1}^{I} \lambda i \cdot Ci(j)^{(n,m)}$$

in which $\lambda i$ is the radioactive decay constant of the precursor and $Ci(j)^{(n,m)}$ is the concentration of the precursor i in mesh j at instant $t_0 + m.\Delta t$ and at iteration n.

The second neutron flux component $\phi^1(j,g)^{(n,m)}$ is obtained as in the preceding description by the resolution of a linear system:

$$-\left[\Sigma t(j,g)^{(n,m)} + \frac{1}{v_g \cdot \Delta t}\right] \cdot \phi^1_{(j,g)}(n,m) +$$

$$\sum_{g'} \Sigma s^{(n,m)}_{(j,g' \to g)} \cdot \phi_{(j,g')}(n,m) - \left[\frac{1}{\Sigma} t(j,g)^{(n,m)} + \frac{1}{v_g \cdot \Delta t}\right] \cdot$$

$$\phi^{0(n,m)}_{(j,g)} + \sum_{g'} \Sigma^1 s(j,g' \to g)^{(n,m)} \cdot \phi^0_{(j,g')}(n,m) + \frac{1}{v_g \cdot t} \cdot \phi^{(m-1)}_{(j,g)} = 0$$

in which $\phi(j,g)^{(m-1)}$ is the neutron flux obtained on time iteration $m-1$ and $v_g$ is the mean neutron velocity of the velocity group g.

Finally, the new sources $Nw(j)^{(n,m)}$ are defined by $$NS(j)^{(n,m)} = (1 - \beta) \sum_g v \cdot \Sigma f(j,g)^{(n,m)} \cdot \phi(j,g)^{(n,m)}$$

We claim:

1. Process for the control of a nuclear reactor having a core containing fissile material assemblies, the fission of the nuclei of said materials being brought about by interactions with neutrons and producing in turn neutrons, said nuclear reactor also having a means for regulating the neutron flux in the reactor core and the power given off by said reactor core, said regulating means comprising at least one assembly of control rods displaceable in said reactor core, said process being characterized in that:

(A) iteratively there is a determination of the neutron fluxes $\phi(j,g)$ for each zone or mesh j $1 \leq j \leq J$ of a group of meshes corresponding to the volume of the reactor core and for each velocity group g $1 \leq g \leq G$ of a plurality of velocity groups for the neutrons; and the numbers of neutrons or sources S(j) emitted by each mesh j, $1 \leq j \leq J$, per volume and time unit, the determination of said values consisting of repeating the following sequence of operations until said values converge:

(a) calculation of the first components of the neutron flux $\phi^0(j,g)$, $1 \leq j \leq J$ as a function of the predetermined coupling matrixes $[\psi g]$ $1 \leq g \leq G$ and sources S(j), each element $\psi g(j,k)$, $1 \leq k \leq K$ and $1 \leq j \leq J$ expressing for neutrons of the velocity group g $1 \leq g \leq G$, the coupling between the mesh j and the adjacent meshes k corresponding to predetermined interaction probabilities of the neutrons with the fissile materials of the core for each mesh j, $1 \leq j \leq J$, (b) calculation of the real interaction probabilities of the neutrons in the core as a function of physical parameters describing the state of the core, (c) calculation of second neutron flux components $\phi^1(j,g)$, $1 \leq j \leq J$ as a function of the neutron fluxes $\phi^0(j,g)$ of the predetermined interaction probabilities of the neutrons in the core and the real interaction probabilities of the neutrons in the core, (d) calculation of the neutron fluxes $\phi(j,g)$ in each mesh j, as the sum of the first and second neutron flux components, (e) calculation of the new sources NS(j), $1 \leq j \leq J$ associated with each neutron flux $\phi(j,g)$ and new values of sources S(j) by the relation:

$$S(j) = \frac{NS(j)}{\sum_{j=1}^{J} NS(j)}$$

(f) calculation of the powers P(j) emitted in each mesh j as a function of the total power P emitted and the sources S(j), (B) the regulating means is controlled as a function of the neutron fluxes $\phi(j,g)$ and powers P(j).

2. Process according to claim 1, wherein the distribution of neutrons in the core is defined by all the following parameters for each j, $1 \leq j \leq J$:

effective macroscopic diffusion section $\Sigma s(j,g\ g')$ of the neutrons of the velocity group g, $1 \leq g \leq G$ in the velocity group g', $g' \neq g$, effective macroscopic absorption section $\Sigma a(j,g)$ of the neutrons of velocity group g, $1 \leq g \leq G$, effective macroscopic fission section $\Sigma f(j,g)$ of the neutrons of velocity group g, $1 \leq g \leq G$.

3. Process according to claim 1, wherein the predetermined interaction probabilities of the neutrons in the core can be defined for each mesh j, $1 \leq j \leq J$ and each velocity group g, $1 \leq g \leq G$ by:

effective macroscopic diffusion sections $\Sigma s^0(j,g\ g')$, whose values are the possible values for said core, an effective macroscopic absorption section $\Sigma a^0(j,g)$, whose value is a possible value for said core, an effective macroscopic fission section $\Sigma f^0(j,g)$ of value equal to zero.

4. Process according to claim, wherein for each mesh j $1 \leq j \leq J$ all the second neutron flux components $\phi^1(j,g)$, $1 \leq g \leq G$ is determined as the solution of the system with G linear equations:

$$-\Sigma t(j,g) \cdot \phi^1(j,g) + \sum_{g=1}^{G} \Sigma s(j,g \to g') \cdot \phi^1(j,g) =$$

$$\Sigma^1 t(j,g) \cdot \phi^0(j,g) - \sum_{g'=1}^{G} \Sigma^1 s(j,g' \to g) \cdot \phi^0(j,g').$$

in which $\Sigma t(j,g) = \Sigma a(j,g) + \sum_{g'=1}^{G} \Sigma s(j,g \to g')$, $$\Sigma^1 t(j,g) = \Sigma t(j,g) - \left[\Sigma a^0(j,g) + \sum_{g'=1}^{G} \Sigma s^0(j,g \to g')\right] \text{ and}$$

$$\Sigma s^1(j,g\ g') = \Sigma s(j,g \to g') - \Sigma s^0(j,g \to g').$$

5. Process according to claim 1, wherein the first component $\phi^0(j,g)$ are calculated in accordance with the relations:

$$\phi^0(j,g) = \sum_{k=1}^{K} \psi g(j,k) \cdot S(j) \cdot v(j)$$

in which v(j) is the volume of the mesh j.

6. Process according to claim 1, wherein the new sources NS(j) are calculated in accordance with the relations:

$$NS(j) = \nu \cdot \sum_{g=1}^{G} \Sigma f(j,g) \cdot \phi(j,g)$$

in which $\nu$ is the average number of new neutrons per volume unit in the core.

7. Process according to claim 3, wherein G=2, the neutron fluxes $\phi(j,1)$ and $\phi(j,2)$ for each mesh j, $1 \leq j \leq J$ being calculated according to the relations:

$$\phi(j,1) = \left[1 - \frac{1}{\frac{\Sigma a(j,1)+\Sigma s(j,1 \to 2)}{\Sigma a(j,1)+\Sigma s(j,1 \to 2)}}\right] \cdot \phi^0(j,1) \text{ and}$$

$$\phi(j,2) = b \cdot \phi^0(j,1) + c \cdot \phi^0(j,2)$$

in which $b =$ $$\frac{1}{\Sigma a(j,2)} \left[\Sigma s(j,1 \to 2) - \Sigma s(j,1 \to 2) \cdot \frac{\frac{1}{\Sigma a(j,1)+\Sigma s(j,1 \to 2)}}{\frac{1}{\Sigma a(j,1)+\Sigma s(j,1 \to 2)}}\right]$$

$$c = 1 - \frac{\frac{1}{\Sigma a(j,2)}}{\Sigma a(j,2)}$$

8. Process according to claim 7, wherein the new sources NS(j) are calculated according to the equation:

$$NS(j) = \nu \cdot \Sigma f(j,1) \cdot \phi(j,1) + \nu \cdot \Sigma f(j,2) \cdot \phi(j,2)$$

in which $\nu$ is the average number of new neutrons per volume unit in the core.

9. Process according to claim 3, wherein for each mesh j $1 \leq j \leq J$, all the second neutron flux components $\phi^1(j,g)^{(m)}$ $1 \leq g \leq G$ is determined iteratively, the values $\phi^1(j,g)^{(n,m)}$ obtained at the nth iteration being calculated as the solution of the system with G linear equations:

$$-\left[\Sigma t(j,g)^{(n,m)} + \frac{1}{vg \cdot \Delta t}\right] \cdot \phi^{1(n,m)}_{(j,g)} + \sum_{g'} \Sigma s^{(n,m)}_{(j,g' \to g)} \cdot \phi^{1(n,m)}_{(j,g)}$$

$$-\left[\Sigma^1 t(j,g)^{(n,m)} + \frac{1}{vg \cdot \Delta t} \cdot \phi^{0(n,m)}_{(j,g)} + \right.$$

$$\left. \sum_{g'} \Sigma^1 s(j,g' \to g)^{(n,m)} \cdot \phi^{0(n,m)}_{(j,g)} + \frac{1}{vg \cdot \Delta t} \cdot \phi^{(m-1)}_{(j,g)} = 0, \right.$$

in which m is a time index, the neutron fluxes being calculated at instants $t = t_0 + m \cdot \Delta t$, n is the iteration index for the calculation of the neutron fluxes at each instant t, $\phi(j,g)^{(m-1)}$ is the neutron flux obtained at the time iteration $m-1$ and $v_g$ is the average velocity of the neutrons of the velocity group g.

10. Process according to claim 1, wherein the first neutron flux components $\phi(j,g)$ are calculated as a function of predetermined coupling matrixes $[\psi g^{PREC}]$ for the delayed neutrons, whereof each element $\psi g^{PREC}(j,k)$ represents the mean flux in the mesh j, for the velocity group g associated with a source uniformly distributed in mesh k and emitting one neutron per second in accordance with a delayed neutron emission spectrum $\chi_g^{PREC}$.

11. Process according to claim 10, wherein the first neutron flux components are calculated in accordance with the equation:

$$\phi^0(j,g)^{(n,m)} = \sum_k [\psi g(j,k) \cdot S_k^{(n-1,m)} + \psi g^{PREC}_{(j,k)} \cdot S_k^{PREC(n-1,m)}] \cdot v_k$$

in which m is a time index, the neutron fluxes being calculated at instants $t = t_0 + m \cdot \Delta t$, n is the iteration index for the calculation of the neutron fluxes at each instant t and $S_k^{PREC}$ is the source, in mesh k, linked with delayed neutron precursors.

12. Process according to claim 11, wherein the sources $S_k^{(n,m)}$ and $S_k^{PREC(n,m)}$ are calculated in accordance with the equations:

$$S_k^{(n,m)} = (1 - \beta) \sum_g \nu \cdot \Sigma f(j,g) \cdot \phi^{(n-1,m)}_{(j,g)}$$

in which $\beta$ is the total number of delayed neutrons per fission neutron and $$S_k^{PREC(n,m)} = \sum_{i=1}^{I} \lambda i \cdot Ci(j)^{(n,m)}$$

in which $\lambda i$ is the radioactive decay constant of the precursor and $Ci(j)^{(n,m)}$ is the concentration of the precursor i in mesh j at instant $t_0 + m \cdot \Delta t$ and at iteration n.

13. Process according to claim 12, wherein the new sources are calculated in accordance with equation:

$$NS(j)^{(n,m)} = (1 - \beta) \sum_g \nu \cdot \Sigma f(j,g)^{(n,m)} \cdot \phi(j,g)^{(n,m)}$$

14. Process according to claim 1, wherein the neutron fluxes $\phi(j,g)$ and sources S(j) being iteratively calculated, said neutron fluxes are initialized to the value zero and said sources to a constant non-zero value.

15. Process according to claim 1, wherein the neutron fluxes $\phi(j,g)$ and sources S(j) are iteratively calculated at an instant t, the said neutron fluxes and said sources being initialized with the values obtained by said process at a preceding instant $t-1$.

* * * * *